Sept. 19, 1961   H. RUEGG ET AL   3,000,197
FLEXIBLE COUPLING MEMBER
Filed Jan. 11, 1960   3 Sheets-Sheet 1

INVENTORS
HANS RUEGG
RICHARD KELLER
ALBERT KLOPFER

BY  N. L. Leek
ATTORNEY

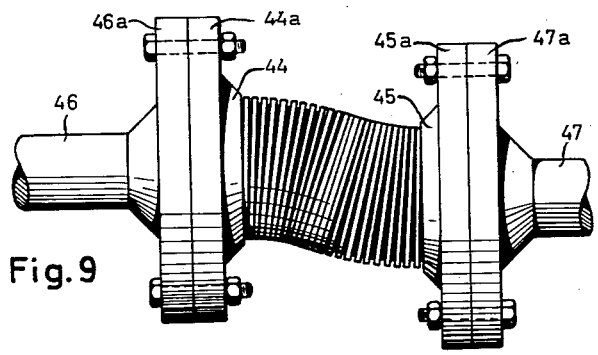
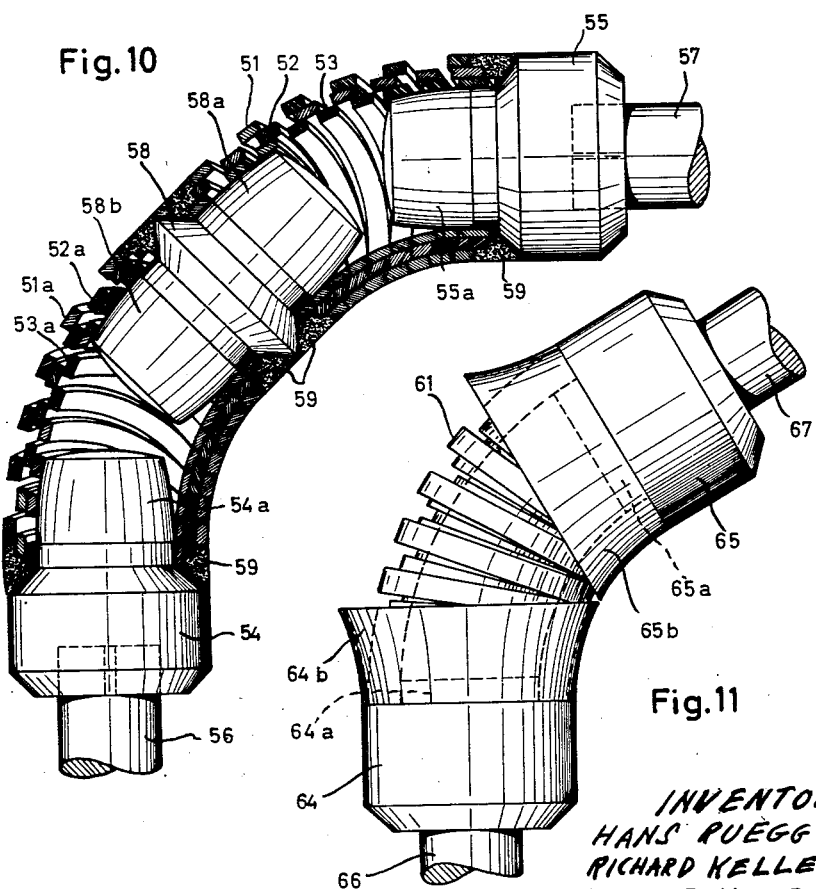

United States Patent Office 3,000,197
Patented Sept. 19, 1961

3,000,197
FLEXIBLE COUPLING MEMBER
Hans Ruegg and Richard Keller, Ruti-Zurich, Switzerland, and Albert Klopfer, Stuttgart, Germany, assignors, by mesne assignments, to Allpatent Aktiengesellschaft, Vaduz, Liechtenstein, a corporation of Liechtenstein
Filed Jan. 11, 1960, Ser. No. 1,477
Claims priority, application Germany Jan. 13, 1959
8 Claims. (Cl. 64—15)

This invention relates to flexible coupling members for connecting a driving shaft to a driven shaft, and has for an object to provide a device of the above type having novel and improved characteristics.

In some such couplings a plurality of helical springs of rectangular wire section, coiled as closely as possible and telescoped into each other with close fit are used as mechanical elements to transmit torque.

The various layers of helical springs, in these known couplings, are coiled from a single length of wire by alternating the direction of pitch. The individual turns are of polygonal form. This method of coiling the various layers from a single length of wire has the disadvantage that for manufacturing reasons the individual layers of the spiral springs in the finished state do not contact each other.

The invention is based on the perception that when the individual layers do not contact each other, a transmission of torque can take place only after the entire spring has been turned by a certain amount, thus decreasing or increasing, respectively, the diameters of adjacent layers which will then contact each other. Only after reaching such conditions during the transmission of torque will the wire section be subjected to pure tension or compression stresses. The turning of the entire spring by even a small amount or angle, as mentioned, is undesirable, particularly when transmitting heavy torque and for frequent starting and stopping of the coupled shafts.

Since the maximum admissible torsional stress is substantially lower than the maximum admissible tension-compression stress, the maximum capacity of the coupling is limited by the torsional stress.

A further object of the invention is to provide a torsionally rigid flexible coupling, wherein initial expansion and contraction of adjoining layers of helical springs is avoided.

For this purpose it is, according to the invention, provided that several helical springs of circular shape, individually coiled and of calibrated size are telescoped into each other with close tolerance, the adjacent layers are of opposite pitch. Therefore it is evident that the section of the spring wire is only subjected to pure tension-compression stresses, since two adjacent individual springs, coiled in opposite pitches, will be pressed against each other at all times and consequently will not permit any undesired turning of the spring assembly. For flexible couplings of torsionally rigid construction, the maximum capacity can be increased 60 to 100 times compared with couplings of the prior art.

For the helical springs of prior art the polygonal course is indispensible since this presents the only means for coupling two shafts. The hardness of the springs does not allow the usual means such as keys, set screws, etc., since it would require a formative machining of the hardened spring steel.

The circular coiling is made possible by a further development of the invention to close the ends of helical springs telescoped into each other with a terminal sleeve rigidly connected thereto by adhesion, soldering, or the like. To serve this purpose the terminal sleeves themselves are shaped in such a way that they can be coupled to shafts in a conventional manner.

When in operation and working at a considerable bending angle, the edges of the rectangular wire section contacting the inner surface of the adjacent layer would cause too high a specific pressure and correspondingly induce wear. In order to avoid this it has been found desirable to provide an arcuate outer surface in the rectangular wire section at least on one of the telescoped helical springs as shown in FIGURE 6. In case of a square section of the spring wire the radius of the arch should be ten to forty times the length of a square side.

Various other objects and advantages will be apparent when the nature of the invention is more fully disclosed.

The nature of the invention will be better understood when taken in connection with the accompanying drawings in which certain specific embodiments of the invention have been set forth.

In the drawings:

FIGURE 9 is a side view of a further embodiment with flange-shaped coupling members connected to corresponding flanges carried by the shaft ends, the latter in this case being displaced parallel to each other;

FIGURE 10 is a side view, partly in cross section, of a further embodiment in which the coupling is composed of two sets of springs and provided with terminal members of a special design, and further with an intermediate connecting element between the two sets of springs; and FIGURE 11 is a side view of a complete coupling with coupling terminals according to a further modification of the invention.

Figure 1:
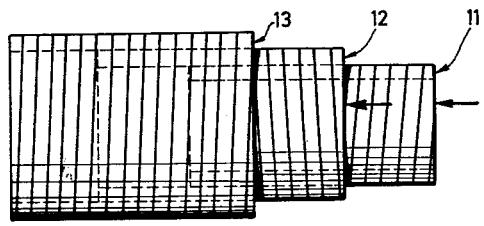
FIGURE 1 is an elevation showing three individual springs forming the spring assembly and telescoped completely in the direction of the arrows.
Figure 3:
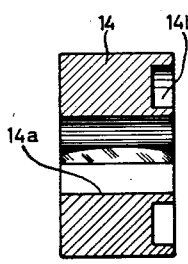
FIGURES 3 and 4 are cross sections through the two coupling members into which the spring assembly is to be pushed.
Figure 2:
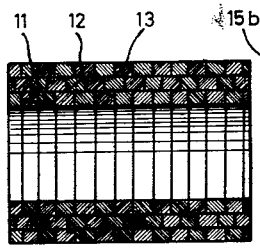
FIGURE 2 is a cross section of the spring assembly.
Figure 4:
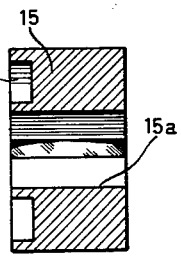
Figure 5:
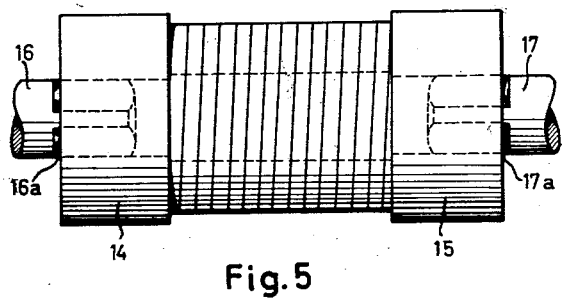
FIGURE 5 is a side elevation of the complete coupling connecting a driving and a driven shaft which provided with square ends fit into the respective square holes of the coupling members.

As can be seen from FIGURES 1 and 2, the individual springs 11, 12, and 13 which are shown before being fitted completely into each other consist of wire with at least approximately square section and are coiled tightly so that the successive convolutions contact each other. The circumference and the inner surface of the individual springs are either ground to size or calibrated by a suitable, accurate coiling method in order to telescope the individual layers into each other with a tight fit.

The adjacent layers, that is the individual springs, are coiled in opposite pitch as indicated in FIGURE 1, and at least one of the springs is preferably multiple-coiled.

In the embodiment according to FIGURES 2 to 5, cylindrical terminal sleeves 14 and 15 are provided, the bores 14a, 15a, respectively, being of square section with chamfered broken corners. The faces are provided with annular grooves 14b and 15b respectively. The section of these ring grooves is adapted to permit a close fit when pushing the terminal sleeves over the ends of spring assembly formed by the individual springs 11, 12, 13. To complete the flexible coupling the terminal sleeves are soldered onto the ends of the spring assembly. It is also conceivable to choose a suitable adhesive or any other method of permanently bonding the surfaces of the end convolutions of the springs with the terminal sleeves. It has also been found advisable to provide such a close fit only at the end surfaces of the spring ends, that is, in FIGURES 3 to 5, between these end surfaces and the bottom of the annular grooves 14b and 15b. However, it is also possible to provide a positive connection between the end surfaces of the springs and a flat end surface on each shaft or on the terminal sleeves.

The ends 16a and 17a of the driving shaft 16 and of the driven shaft 17, respectively, are of corresponding square section to fit the bores 14a and 15a of the terminal sleeves. These shaft ends may therefore be connected with a close fit to the terminal sleeves 14 and 15 and be easily disconnected therefrom.

Figure 6:
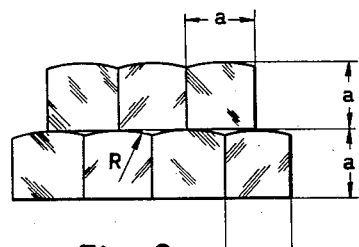
FIGURE 6 is an example of the wire section.

FIGURE 6 illustrates that, while the spring wire has a substantially square cross section, with the sides thereof having a length $a$, the outer side is arcuately curved with a radius R. It may then be advisable to make the length of the entire spring not greater than twice the outer diameter of the spring coils. Such a cross-sectional shape of the spring is designed to avoid when the spring is bent when in operation that the corners of the rectangular wire will form the only points of engagement with the flat inner surface of the adjacent outer layer which would result in an excessive surface pressure and an undue wear upon the individual springs.

Figure 7:
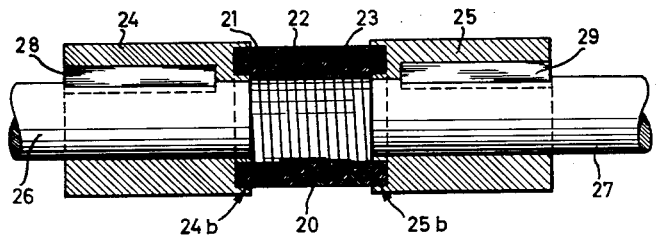
FIGURE 7 is in cross section another embodiment with coupling members keyed to the shafts.

In the embodiment of FIGURE 7 the spring assembly is composed of four layers (individual springs) 20 to 23 and the terminal sleeves of greater length are also provided with ring grooves slipped over the ends of the spring assembly and soldered thereto. The mechanical connection with the driving shaft 26 and the driven shaft 27 in this case is performed by flat keys 28 and 29 which fit into corresponding keyways of the shafts and terminal sleeves.

Figure 8:
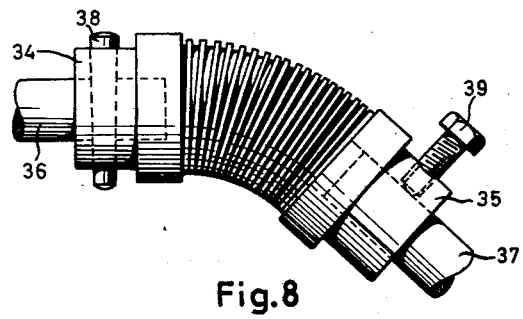
FIGURE 8 is a side view of a further embodiment with coupling members secured to the shaft ends by a taper pin on one side and by a set screw on the other side, the two shafts being located at an angle to each other.

In the embodiment shown in FIGURE 8 the driving shaft carries a terminal sleeve 34, the two members being fixed by a taper pin 38. The other terminal sleeve 35 is fixed to the driven shaft 37 by a set screw 39.

The axes of shafts 36 and 37 in this case are shown under working condition at an angle to each other, corresponding to the number of convolutions shown at a maximum of about 45°. By correspondingly lengthening the spring, torque can be transmitted between shafts which are disposed at an angle of almost 90° to each other.

In the embodiment of FIGURE 9 the terminal sleeves 44 and 45, respectively, carry flanges 44a and 45a, respectively, and the shaft ends 46 and 47, respectively, are likewise provided with flanges 46a and 47a, respectively. The axes of the shafts 46 and 47 are displaced parallel to each other, thus the spring will be bent in an S-shape.

In the embodiment of FIGURE 10 the driving shaft 56 and the driven shaft 57 are connected by means of square ends with a close fit to terminal members 54 and 55, respectively. These terminal members are provided with projecting studs 54a and 55a which are inserted into the springs 51 to 53 and 51a to 53a which form two separate spring sets. The peripheral surface of each of these studs forms a surface of revolution having a generatrix corresponding to the strongest intended curvature of the inner side of the innermost spring and thus forming a supporting surface for this spring surface when the coupling is bent to a maximum degree. The two sets of springs 51 to 53 and 51a to 53a are connected to each other by an intermediate member 58 which is also provided with two studs 58a and 58b similar to the studs on the terminal members as just described. The adjacent ends of the two sets of springs are positively connected to each other by a suitable material 59 as illustrated in FIGURE 10, in which the central part of the connecting member 58 is also embedded. This manner of connecting two sets of springs to each other permits the entire coupling to be bent at an angle twice as large as that to which a coupling with a single set of springs may be bent.

The embodiment of FIGURE 11 also shows a coupling in which the driving shaft 66 and the driven shaft 67 are plugged tightly into terminal members 64 and 65 which, in turn, are secured to the end surfaces of a set of springs 61 and have projecting studs 64a and 65a, respectively, at the inside thereof which are plugged into the inner spring, while an outer funnel-like extension 64b or 65b on each terminal member 64 and 65 surrounds and overlaps the ends of spring 61. The inner surface of these funnel-like extensions 64b and 65b has a curvature corresponding to that of the outer surface of spring 61 when the same is bent to its maximum degree, and it thus forms a support for the spring at such a time.

The flexible coupling according to the invention also permits a slight axial movement of the shafts since a spring set with springs of 20 convolutions only requires intervening spaces of no more than 1/10 mm. (.004″) between the adjacent convolutions of each spring to permit an axial movement of 2 mm. (.080″).

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A flexible coupling member for transmitting torque between a pair of shafts, comprising a plurality of concentric helical springs forming a set, each of said springs being composed of closely spaced helically wound wire of substantially rectangular cross section, the adjacent concentric springs being in close contact with each other and having windings of opposite pitch, and means including a radial flange rigidly fixed to each of said shafts and having a radial surface contacting and permanently bonded to the surfaces of the end convolutions of each of said springs for thereby rigidly securing all of said springs to said shafts.

2. A coupling member as set forth in claim 1, in which the outer surface of the substantially rectangular wire section of at least one of said springs engaging in a radial direction with an adjacent spring is convex.

3. A coupling member as set forth in claim 2, in which said surface has a radius of convexity between 10 and 40 times the length of the rectangular section of said wire.

4. A coupling member as set forth in claim 1, in which the total length of said set of concentric springs amounts to no more than twice the diameter of the outermost spring.

5. A coupling member as set forth in claim 1, in which at least one of said springs of said set is a multiple-coiled spring.

6. A coupling member as set forth in claim 1, in which said flange comprises a terminal member rigidly secured to each end of said set of springs and adapted to be rigidly secured to the end of one of said shafts.

7. A coupling member as set forth in claim 6, in which each of said terminal members comprises a metal cup and said flange forms a transverse wall of said cup with an opening therein adapted to receive the end of one of said shafts.

8. A coupling member as set forth in claim 1 in which said concentric springs are circular in section throughout their length.

(References on following page)

References Cited in the file of this patent

UNITED STATES PATENTS

| | | |
|---|---|---|
| 779,374 | Phillips | Jan. 3, 1905 |
| 1,429,146 | Karge | Sept. 12, 1922 |
| 2,761,297 | Buchsteiner | Sept. 4, 1956 |
| 2,917,909 | Josutis | Dec. 22, 1959 |

FOREIGN PATENTS

| | | |
|---|---|---|
| 640,207 | Germany | Dec. 24, 1936 |